United States Patent [19]

Moldenhauer

[11] Patent Number: 4,826,132
[45] Date of Patent: May 2, 1989

[54] SOLENOID VALVE, ESPECIALLY AN OUTLET VALVE FOR INFUSION WATER

[75] Inventor: Hermann Moldenhauer, Düsseldorf, Fed. Rep. of Germany

[73] Assignee: Firma A.U.K. Muller GmbH & Co. KG, Dusseldorf, Fed. Rep. of Germany

[21] Appl. No.: 222,475

[22] Filed: Jul. 21, 1988

[30] Foreign Application Priority Data

Jul. 21, 1987 [DE] Fed. Rep. of Germany ... 8709978[U]

[51] Int. Cl.[4] .................. F16K 31/06; F16K 25/00
[52] U.S. Cl. .................. 251/129.17; 251/331; 251/333; 251/368; 137/242; 137/375
[58] Field of Search .......... 251/129.17, 333, 331, 251/368; 137/242, 375

[56] References Cited

U.S. PATENT DOCUMENTS

| | | | |
|---|---|---|---|
| 3,034,761 | 5/1962 | Janquart | 251/129.17 X |
| 3,098,635 | 7/1963 | Delaporte | 251/129.17 X |

FOREIGN PATENT DOCUMENTS

3327589 2/1985 Fed. Rep. of Germany .............. 251/129.17

*Primary Examiner*—Arnold Rosenthal
*Attorney, Agent, or Firm*—Sprung, Horn, Kramer & Woods

[57] ABSTRACT

A solenoid valve, especially an outlet valve for infusion water. A valve chamber (2) is accommodated in a valve housing (1) and communicates with a supply channel (Z) and with a drain channel (A) by way of a valve seat (3). The magnetic armature (6) of a magnetic system accommodated on valve housing (1) is connected to a valve plate (10) accommodated in the valve chamber (2) opposite the valve seat (3). The valve chamber (2) is sealed off from the interior (11) of the magnetic system by an isolating diaphragm (12). To prevent calcium deposits, the valve seat (3) has a sheet (13) of polytetrafluoroethylene accommodated coaxially along its inner circumference and projecting beyond the surface of the valve seat (3) on the side facing the valve plate (10). The upper edge of the sheet (13) facing the valve plate (10) is in sealing plane with respect to the valve plate. The valve plate (10) consists of a resilient material that is softer than the sheet (13), and the surface that faces the valve seat (3) is radially at an acute angle to the sealing plane in the vicinity of the contact areas.

12 Claims, 3 Drawing Sheets

SOLENOID VALVE, ESPECIALLY AN OUTLET VALVE FOR INFUSION WATER

BACKGROUND OF THE INVENTION

The invention relates to a solenoid valve, especially an outlet valve for infusion water, with a valve housing accommodating a valve chamber that communicates directly with a supply channel and by way of a valve seat with a drain channel, and with a magnetic system mounted on the valve housing with a magnetic coil accommodating a magnetic armature positioned in a positioning tube located opposite a head in the upper part of the magnet coil and connected to a magnet yoke, the armature also being connected at the end facing the valve seat to a valve plate by way of a valve shaft, and the valve chamber being sealed off from the interior of the positioning tube by an isolating diaphragm whose outer edge is connected to and seals off the valve housing and whose inner edge is connected to and seals off the valve plate.

Solenoid valves of this kind, of the so-called medium-isolated type, are used primarily in hot-beverage vending machines and are in themselves known. A valve of the aforesaid type is described for example in the prior DE-OS No. 3 613 481.

When the valves are used as outlet valves for infusion water, they are subjected to very high stress and must be overhauled regularly and even replaced after a relatively short service life.

It has been found that a number of factors are responsible for this high stress. When, for example, water with a high calcium content is used, calcium deposits form relatively rapidly in the valve housing and especially on the valve seat and valve plate. Initially this merely leads to a certain amount of leakage and not to complete failure of the valve. Since, however, the drops of water that occur as a result of leakage evaporate at the interface between the water-channeling part of the valve and the atmosphere, the salts that cause hardness in the water are deposited at that point, eventually resulting in complete failure of the valve. The process is accelerated by the high temperature of the medium.

In soft-water areas, calcination is of minor importance as a cause of failure. Instead, ferritic constituents form as a result of mechanical abrasion of the magnetic armature in the positioning tube and precipitate in the enclosed armature chamber. The result is a corrosion-prone powder that accumulates in the valve's magnetic system and corrodes there. This process is further accelerated by the fact that, despite the isolating diaphragm between the valve chamber and the interior of the positioning tube, moisture can eventually penetrate into the interior of the chamber. This is due to the fact that thin-walled diaphragms made of silicone material are used as isolating diaphragms. Water vapor, especially near the boiling point, can diffuse in small quantities through this material. A condensate accumulates on the side of the diaphragm that faces the interior of the guide tube. This condensate is calcium-free, but causes the ferritic material abraded from the magnetic armature to turn into iron oxide. As a result of this corrosion abrasion, depending on the frequency with which the unit is switched on, the magnetic armature can eventually clog up. Furthermore, as a result of the accumulation of the water of condensation at the point where the valve shaft is secured to the valve plate, which is generally integrated into the isolating diaphragm, changes in stroke can occur which result in inaccurate portion control.

In especially unfavorable cases, diffusion of water through the isolating diaphragm can even result in failure of the electric control system.

Finally, it has also been found that despite a high level of manufacturing precision, the magnetic armature tends to assume a preferred position in the positioning tube. As a consequence the valve plate is exposed to asymmetric contact pressure in the vicinity of the seal. The calcium deposits are thickest at the point of least contact pressure.

SUMMARY OF THE INVENTION

The object of the instant invention is to improve a solenoid valve of the aforesaid type such that the aforesaid drawbacks do not occur and especially such that deposition of calcium in the area between the valve plate and valve seat is prevented. In addition, the new solenoid valve is intended to make it possible to prevent formation of water of condensation inside the positioning tube. This will considerably extend the life of the valve.

This object is attained in accordance with the invention by the improvement wherein the valve seat has a sheet of polytetrafluoroethylene extending along its inner circumference coaxial with the axis of the valve shaft and projecting out longitudinally on the side facing the valve plate beyond the surface of the valve seat to a prescribed extent, with the surface of the edge of the sheet facing the valve plate situated in a sealing plane perpendicular to the axis of the valve shaft, wherein the valve plate is made out of a resilient material that is softer than the sheet, and wherein the surface of the valve plate that faces the valve seat is radially at an acute angle to the sealing plane at least at the points of contact.

It has been found to be a particular advantage for the sheet projecting beyond the surface of the valve seat to be in the shape of a closed tubular section and to project beyond the surface of the valve seat essentially to the extent of its own thickness.

It has also been found to be an advantage for the interior of the positioning tube in the area immediately above the isolating diaphragm to communicate with the space outside the valve through at least one vent to suppress formation of water of condensation inside the isolating diaphragm.

Several vents can in fact be provided at the circumference of the valve housing, distributed in a plane perpendicular to the axis of the valve shaft.

The valve plate, which is essentially the frustum of a cone, can be secured to the valve shaft by a threaded connection in that a pin is shaped onto the end of the valve shaft and has a non-cutting thread that screws into a bore in the valve plate.

Furthermore, a tubular support can be accommodated in the essentially frustoconical valve plate coaxial with the axis of the valve shaft and extend toward the solenoid armature, out of the valve plate, and into the interior of the positioning tube, with drainage grooves extending at least along its outer surface and its entire length.

An especially long-lived embodiment of the valve according to the invention is obtained as a result of the extremely low abrasion that occurs as the magnetic armature moves in the positioning tube when a sheet made of a polymer containing fluorine, and graphite or carbon as a filler, is inserted into the section of the positioning tube adjacent to the head, surrounding the magnetic armature at its surface to a prescribed extent, and is secured axially and radially at least at the end facing the head.

As will be specified later herein with reference to one embodiment, it has been found that no calcium deposits will occur in the solenoid valve in accordance with the invention and that, especially in the preferred embodiments, the formation of water of condensation inside the isolating diaphragm can be suppressed and a long service life assured for the valve.

One embodiment of a solenoid valve in accordance with the invention will now be specified with reference to the attached drawings.

DETAILED DESCRIPTION OF THE INVENTION

Figure 1:
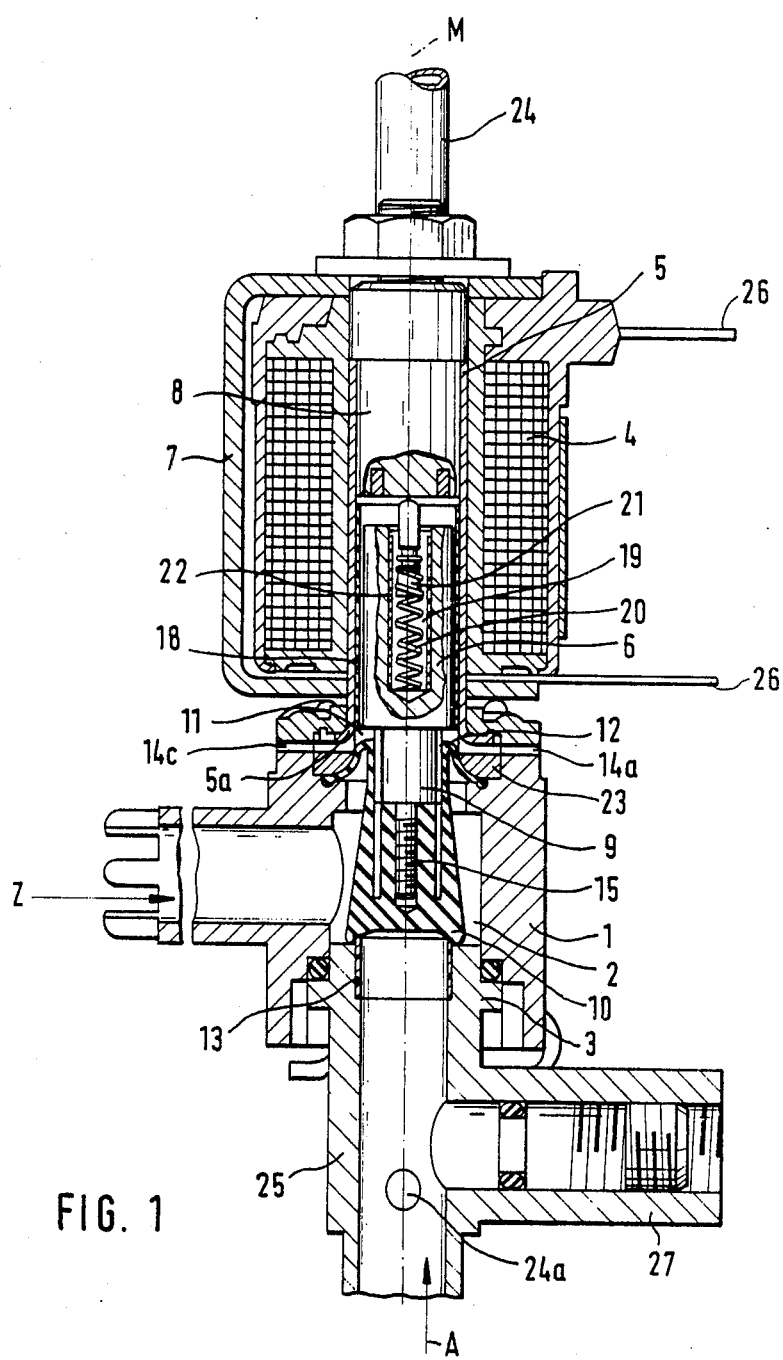
FIG. 1 illustrates a solenoid valve in longitudinal section.
Figure 2:
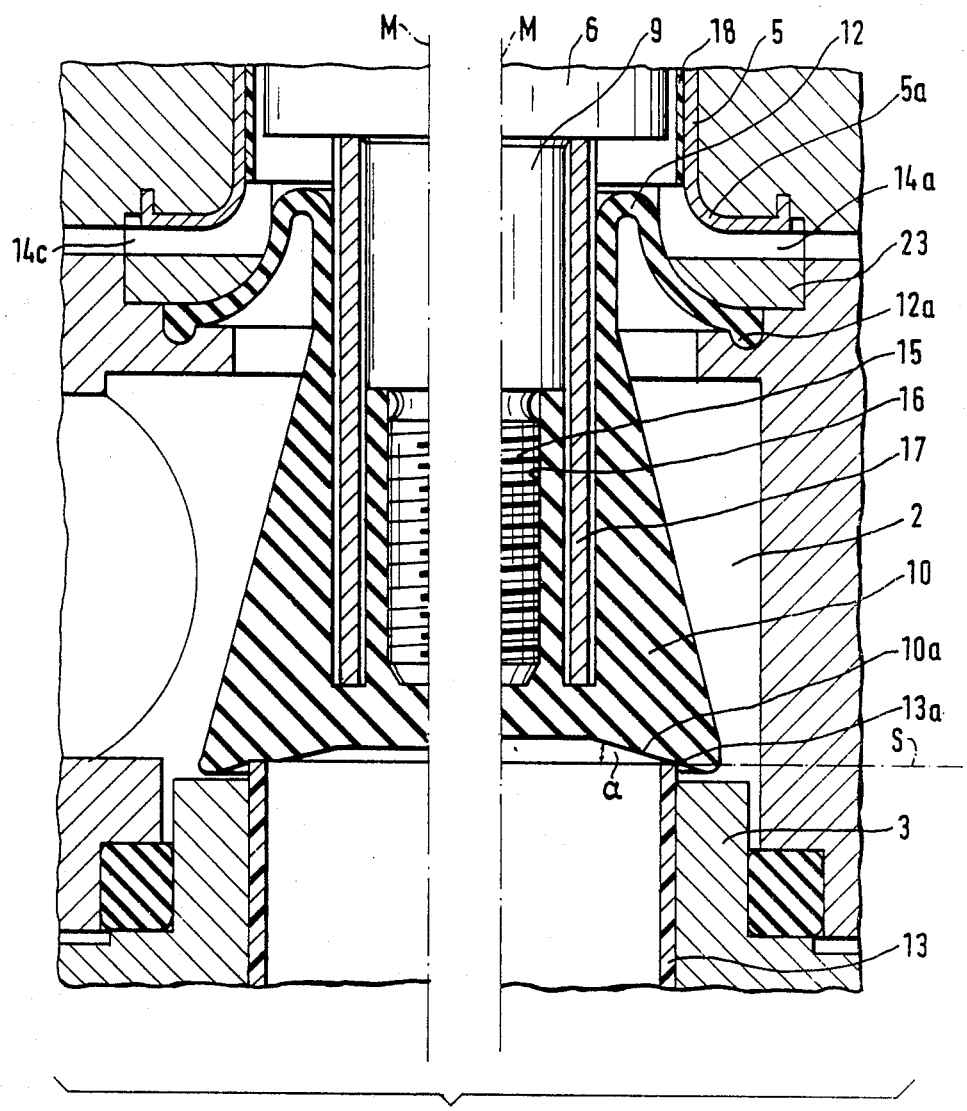
FIG. 2 is a larger-scale view showing a section through the valve in FIG. 1 in the vicinity of the valve seat.
Figure 3:
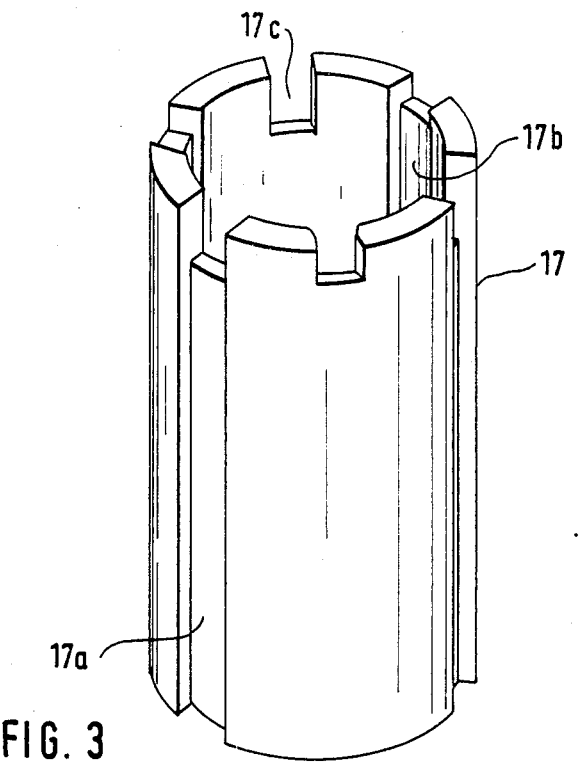
FIGS. 3 and 4 show individual components of the valve illustrated in FIGS. 1 and 2 respectively.

The solenoid valve illustrated in FIGS. 1 through 3 is intended as an outlet valve for a hot-beverage vending machine and comprises a valve housing 1 accommodating a valve chamber 2. An intake Z opens into the valve chamber. At the bottom of housing 1 is a lower section 25 with a downward outflow A and at its upper section, which demarcates valve chamber 2, is a valve seat 3. Facing the valve seat is a valve plate accommodated in valve chamber 2.

Valve plate 10 is the frustum of a cone and is in a practical way made out of a silicone material. At its upper edge it merges and is integrated into an isolating diaphragm 12 connected at its outer edge 12a to and sealing off housing 1. The chamber above isolating diaphragm 12 is accordingly isolated liquid-tight from valve chamber 2. Valve plate 10 is secured as will be specified later herein to a valve shaft 9 that is an extension of a magnetic armature 6. Magnetic armature 6, which is part of the solenoid valve's magnetic system, is positioned in a positioning tube 5 accommodated inside a magnetic coil 4. A head 8 is located in the upper section of magnetic coil 4 and is connected to a magnetic yoke 7 that surrounds magnetic coil 4. An electric terminal 26 is positioned on the side of the magnetic system.

Isolating diaphragm 12 is a rolling diaphragm and valve plate 10 is integrated into it in such a way that the effective surface of rolling diaphragm 12, which is active upward in the opening direction, is smaller than the effective surface of valve plate 10, which is active in the closing direction. This ensures that, on the one hand, the closing of the valve is reinforced by the pressure of the medium and only the opening force produced by the difference between the pressures acting on the two active surfaces need be applied by the magnetic system.

With particular reference now to FIG. 2, a sheet 13 shaped like a tube and made of polytetrafluoroethylene is accommodated in valve seat 3 in such fashion that it projects longitudinally beyond valve seat 3 on the side facing valve plate 10 to an extent that roughly corresponds to its thickness. This thickness can be 0.5 mm for example.

A flat section of sheet can of course also be inserted instead of a tubular section along the circumference of valve seat 3.

In this embodiment the upper edge 13a of sheet 13 extends in a plane S, perpendicular to central axis M, that can be designated a "sealing plane." Valve plate 10 is made out of a material that is softer than sheet 13. The surface of valve plate 10 facing valve seat 3 is slightly concave, and the areas 10a that come into contact with the valve seat when the valve closes are radially at an acute angle to sealing plane S.

FIG. 2 illustrates a valve plate 10 during the closing process. The right-hand side of FIG. 2 shows the position of valve plate 10 shortly before it reaches the final sealing position at the moment when contact areas 10a come to rest against the upper edge 13a of sheet 13.

The left-hand side of FIG. 2 shows the final sealing position, in which a slight deformation of contact areas 10a has occurred because of the softer material on the bottom of valve plate 10.

The consequence of the aforesaid seating of valve plate 10 against the upper edge of the sheet 13 in valve seat 3 is that the valve plate rests at a specific high surface pressure against the valve seat without damaging the surface of the valve plate. Instead, the resiliency of the material of valve plate 10 initiates a relative motion that automatically removes adhesive calcium particles that tend to settle on the inside of the valve seat. The material that sheet 13 is made out of repels calcium because of its surface characteristics, so that calcium deposits are almost completely eliminated in this functionally important area. It has been found that, although the valve seat created by the upper edge of valve 13 matches the shape of valve plate 10, the valve seat retains a sharp edge and does not lose its effectiveness. Calcium particles entrained in the medium do not settle on the valve seat but either precipitate out beforehand or are carried along as the medium flows through the valve.

Because of the high specific surface pressure between the valve plate and the valve seat, it is no longer necessary to ensure the tightness of the valve with a powerful restoring spring. This reduces the load on the electric components of the valve.

Valve plate 10 is, as will be especially evident from FIG. 2, secured to valve shaft 9 with a threaded connection. For this purpose valve shaft 9 has a threaded pin 15 extending out of it and having a non-cutting thread that screws into a bore 16 in valve plate 10. The thread must be designed to ensure that, depending on the Shore hardness of the silicone material, as much of the thread as possible will be occupied by the material. This means that a finer thread must be employed with a harder material and a coarser thread with a softer material. This method of attachment has on the one hand the advantage that the valve plate is well positioned and will not be displaced laterally and on the other that, if liquid accumulates behind isolating diaphragm 12, the valve will not change its stroke.

The accumulated water is prevented from diffusing through isolating diaphragm 12, however, by a number of other measures. This is primarily accomplished by venting the interior 11 of positioning tube 5 in the area immediately above isolating diaphragm 12 so thoroughly that water escaping from isolating diaphragm 12 cannot penetrate deeper into the interior but evaporates, leaving no residue. Vents 14a–14d are used for this purpose, distributed around the circumference of the valve housing in a plane perpendicular to the axis of valve shaft 9.

Figure 4:
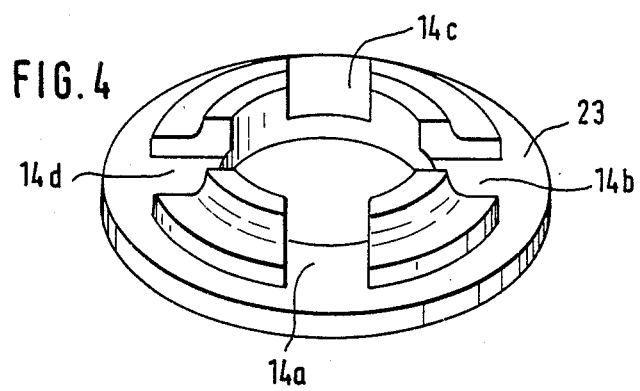

As will be evident from FIG. 4 in conjunction with FIG. 2, vents 14a–14d are accommodated in a plate 23 that is inserted in the housing and on which rests the lower section 5a of positioning tube 5, which expands outward like a flange.

To augment the venting of the interior of valve plate 10 even more, the illustrated embodiment has a tubular support 17 accommodated in valve plate 10 coaxial with the axis M of valve shaft 9. Support 17 is illustrated in detail in FIG. 3. Support 17 has drainage grooves 17a on its exterior and drainage grooves 17b on its interior. It is positioned inside valve plate 10 with its upper section extending into the interior 11 of positioning tube 5 and rests against the lower surface of magnetic armature 6. Drainage grooves 17a and 17b accordingly open directly into interior 11, with inner drainage grooves 17b communicating with interior 11 through openings 17c which connect, at the upper end of support 17, the interior of the support with interior the 11 of the positioning tube. This design ensures that the venting of the valve interior will also extends into the interior of valve plate 10 and increase the stability. The employment of such a support is a particular advantage in larger valves.

To counteract the abrasive corrosion of magnetic armature 6, a sheet 18 around magnetic armature 6 and its surface is inserted to a prescribed extent into the section of positioning tube 5 adjoining head 8. Sheet 18 is made out of a polymer that contains fluorine along with graphite or carbon as a filler and is radially and axially secured in positioning tube 5. The advantage of this design is that no ferritic abraded material will form on the surface of magnetic armature 6, considerably extending the life of the valve. By ensuring correspondingly accurate tolerances for magnetic armature 6 and sheet 18, it is possible to limit the lateral deflection of the magnetic armature to a minimum. This in turn means that valve plate 10 will always assume the same position at the upper edge of sheet 13 in valve seat 3.

A helical compression spring 20 is accommodated in a longitudinal bore 19 in valve armature 6 in the capacity of a restoration spring. Spring 20 is secured to head 8 by a projection 21 that engages bore 19. To prevent metallic abrasion of compression spring 20, a sheet 22 made out of a polymer that contains fluorene along with graphite or carbon as filler is also accommodated in longitudinal bore 19, surrounding coil compression spring 20.

The requisite electric energy is supplied to magnetic coil 4 by terminals 26.

To prevent any water that could form calcium deposits before the next drainage process, and accordingly lower the dispensing temperature of the water, from remaining in drain A after the valve closes, a venting device is provided with a vent 24a inside drain A, with which a vent tube 24 communicates. Tube 24 extends to a prescribed height (not illustrated) above the water level of a container connected with the valve.

The valve is opened by the excitation of magnetic coil 4 and the attraction of magnetic armature 6 against the action of restoring spring 20. When magnetic coil 4 is deactivated, the valve closes subject to spring 20, whereupon, because of the design of the side of valve plate 10 that faces valve chamber 2 in relation to the effective surface of diaphragm 12, the closing force is reinforced by the pressure of the medium.

Finally, a throttle 27 is provided on lower section 25.

What is claimed is:

1. In a solenoid valve, having a valve housing, means forming a valve chamber in the housing, including a valve seat, a supply channel in communication with a drain channel, a supply channel in communication with the chamber, magnetic means mounted on the valve housing and including a magnetic coil and a magnetic armature positioned in a positioning tube within the magnet coil, a valve plate having one end facing the valve seat, a valve shaft connecting another end of the valve plate to the armature and means sealing off the valve chamber from the interior of the positioning tube comprising an isolating diaphragm having an outer edge connected to the valve housing and an inner edge connected to the valve plate, the improvement wherein the valve seat has an inner circumference and a planar surface facing the valve plate and the valve seat has a sheet of polytetrafluoroethylene extending along the inner circumference thereof and coaxial with the axis of the valve shaft and projecting outwardly from the valve seat longitudinally on the side facing the valve plate beyond the surface of the valve seat to a preselected extent, with the surface of the edge of the sheet facing the valve plate situated in a sealing plane perpendicular to the axis of the valve shaft, wherein the valve plate is composed of a resilient material that is softer than the sheet, and wherein the surface of the valve plate that faces the valve seat is radically at an acute angle to the sealing plane at least at the points of contact.

2. The solenoid valve in accordance with claim 1, wherein the isolating diaphragm is integral with the valve plate.

3. The solenoid valve in accordance with claim 2, wherein the isolating diaphragm and valve plate are composed of a silicone material.

4. The solenoid valve in accordance with claim 1, wherein the sheet has the shape of a closed tubular section.

5. The solenoid valve in accordance with claim 1, wherein the sheet projects beyond the surface of the valve seat approximately as far as the sheet is thick.

6. The solenoid valve in accordance with claim 1, wherein the interior of the positioning tube in an area immediately above the isolating diaphragm has at least one vent for communicating with the space outside the valve.

7. The solenoid valve in accordance with claim 6, comprising several vents at the circumference of the valve housing and distributed in a plane perpendicular to the axis of the valve shaft.

8. The solenoid valve in accordance with claim 1, wherein the valve plate comprises substantially the frustum of a cone and means securing same to the valve shaft comprising a threaded connection with a pin having a non-cutting thread shaped onto one end of valve shaft and engaging a bore in the valve plate.

9. The solenoid valve in accordance with claim 1, wherein the valve plate is frustoconical and further comprising a tubular support in the frustoconical valve plate coaxial with the axis of the valve shaft and extending toward the magnetic armature out of the valve plate and into the interior of the positioning tube and wherein the support has drainage grooves extending along its entire length, at least on its outer surface.

10. The solenoid valve in accordance with claim 9, wherein the support surrounds the valve shaft and is adjacent to the magnetic armature and has connecting openings at least in the vicinity of the drainage grooves in the end of the support adjacent to the magnetic armature, whereby the openings connect the interior of the support with the interior of the positioning tube.

11. The solenoid valve in accordance with claim 1, wherein the magnetic means has a head at an upper portion thereof and a second sheet composed of a polymer that contains fluorene and with graphite or carbon as a filler is inserted into a section of the positioning tube adjacent to the head and surrounding the magnetic armature at its surface to a given extent and is secured axially and radially at least at an end facing the head.

12. The solenoid valve in accordance with claim 11, wherein the magnetic armature has a longitudinal bore of a given depth on a side facing the head, wherein the bore accommodates a helical spring and the head has a projection that engages the longitudinal bore, with one end of the coil spring secured to the projection, and wherein a third sheet of a polymer that contains fluorene and has graphite or carbon as a filler is inserted into the longitudinal bore and surrounds the spring.

* * * * *